United States Patent Office 3,641,219
Patented Feb. 8, 1972

3,641,219
POLYHYDROXY PHOSPHATE ESTERS OF HALOGENATED PHENOL AND HALOGENATED ANILINE
George J. Stockburger, Wilmington, Del., assignor to Atlas Chemical Industries Inc., Wilmington, Del.
No Drawing. Filed Dec. 9, 1968, Ser. No. 782,456
Int. Cl. C07f 9/08; C08g 22/44
U.S. Cl. 260—929   10 Claims

ABSTRACT OF THE DISCLOSURE

Polyhydroxy phosphate esters may be prepared by sequentially reacting polyphosphoric acid and alkylene oxide with an alcohol of the formula

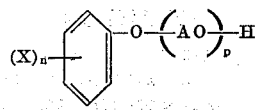

or of the formula

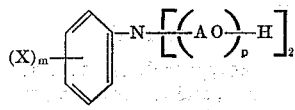

wherein X represents a halogen atom, $n$ is an integer from 1 to 5, $m$ is an integer from 1 to 5, A represents an alkylene group containing from 2 to 4 carbon atoms, and $p$ is from 1 to 5. The polyhydroxy phosphate esters are useful as intermediates in the production of flame-resistant products.

---

This invention relates to novel polyhydroxy phosphate esters and to novel processes for producing polyhydroxy phosphate esters.

Polyurethane compositions prepared from organic polyisocyanates and polyols, for example, polyhydric polyesters and polyhydric polyethers, have a wide range of physical properties which make them potentially useful in widely divergent fields of application. For many of such potential uses, the inherent flammability of polyurethane compositions is a serious disadvantage, and the problem of rendering them flame-retardant has received considerable attention.

It is known to incorporate phosphorous-containing compounds into polyurethane compositions, either as non-reactive plasticizing components or as resin-forming ingredients, to confer flame-resistance to the finished products. Unfortunately, such modification has usually been accompanied by sacrifice of desirable characteristics, particularly polymer resiliency. Furthermore, many of the phosphorous-containing polyols available for polyurethane compositions prior to this invention are unstable.

It is an object of this invention to provide novel polyhydroxy phosphate esters.

It is an object of this invention to provide phosphorous-containing polyols which are stable.

It is another object of this invention to provide polyhydroxy phosphate esters suitable for use in making flame-retardant polyurethanes.

It is another object of this invention to provide polyhydroxy phosphate esters suitable for use in making moisture-curing polyurethane coating compositions which, after application to substrates, yield transparent coatings having superior flame-retardancy and resiliency.

It is another object of this invention to provide a process for the preparation of polyhydroxy phosphate esters.

These and other objects of this invention will become apparent from the following description.

The polyhydroxy phosphate esters of this invention may be prepared by sequentially reacting polyphosphoric acid and alkylene oxide with an alcohol characterized by the formula

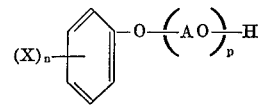

or by the formula

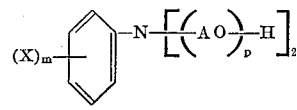

wherein X represents a halogen atom, $n$ is an integer from 1 to 5, $m$ is an integer from 1 to 5, A represents an alkylene group containing from 2 to 4 carbon atoms, and $p$ is from 1 to 5. The alcohol and polyphosphoric acid are first reacted together at moderate temperatures to form an acidic partial ester, and this acidic partial ester is then reacted with alkylene oxide to form an essentially neutral polyhydroxy phosphate ester. The resulting polyhydroxy phosphate ester may be sequentially reacted with additional polyphosphoric acid and alkylene oxide, provided that alkylene oxide is used in the final reaction.

Throughout the specification and in the appended claims, the term "a polyphosphoric acid" is meant to include phosphoric acid anhydride ($P_2O_5$) and hydrates thereof containing two or more phosphorus atoms per mole. It is preferred to employ the anhydride itself or a polyphosphoric acid containing at least 80% thereof. Particularly preferred is a polyphosphoric acid containing from 82 to 84% $P_2O_5$.

The alcohols which are sequentially reacted with polyphosphoric acid and alkylene oxide to prepare the polyhydroxy phosphate esters of this invention, may be prepared by reacting alkylene oxide with a halogenated phenol or a halogenated aniline under etherification condition well known in the art. Illustrative examples of such alcohols include polyoxypropylene(2)dichloroaniline,
polyoxyethylene(2)dichloroaniline,
polyoxypropylene(2)pentachlorophenol,
polyoxypropylene(1)pentachlorophenol,
polyoxypropylene(5)pentachlorophenol,
polyoxypropylene(10)dichloroaniline,
polyoxypropylene(2)monochlorophenol,
polyoxybutylene(2)pentachlorophenol,
polyoxypropylene(2)pentachloroaniline,
polyoxybutylene(4)tetrabromophenol,
polyoxypropylene(2.2)dibromoaniline,
polyoxypropylene(2)pentabromophenol, and the like.

In accordance with this invention, an alcohol as defined above is first caused to react with a polyphosphoric acid to form an acidic partial ester. Preferably, the portion of alcohol to polyphosphoric acid taken is at least sufficient, together with any water of composition in the polyphosphoric acid component, to convert all phosphorus present to the orthophosphate form.

The alcohol and polyphosphoric acid are brought together under reaction conditions sufficiently mild that esterification between P—OH and alcoholic hydroxyl groups with concomitant liberation of water is avoided. For example, PO in dry powder form, or as a slurry in an inert diluent such as toluene, may be added gradually to the alcohol while maintaining the temperature in the range of from 50° to 150° C., and preferably below about 110° C. The reaction is complete when all the $P_2O_5$ is dissolved. When employing a hydrated polyphosphoric acid, the reaction goes so readily that external heat need not be applied. In fact, in the interest of obtaining light-colored products it is highly preferred to control the temperature, by external cooling, or by limiting the rate of introduction of one reactant into the other, to below about 60° C. It is sometimes advantageous, to obtain more rapid mixing and better heat transfer, to carry out the reaction in the presence of an inert diluent, preferably a solvent for the alcohol and/or the resulting acidic partial ester.

The acidic partial ester is then reacted with a sufficient quantity of an alkylene oxide containing from 2 to 4 carbons to substantially neutralize the acidity. Suitable alkylene oxides are those containing from 2 to 4 carbon atoms. Alkylene oxides which are substituted, for example, the epihalohydrin, may be employed as well as unsubstituted epoxides. Ethylene oxide, propylene oxide, butylene oxide, and epichlorohydrin are exemplary of those which may suitably be employed. The alkylene oxide is added gradually to the agitated reaction mass from the first stage while controlling the temperature, particularly in the early stages, to below 150° C. and preferably below 110° C. The alkylene oxide addition is continued until the acid number levels off at a low value. Unreacted alkylene oxide and diluent, if such has been employed, are stripped from the neutralized product under reduced pressure and moderately elevated temperatures to yield a substantially neutral polyhydroxy phosphate ester.

The polyhydroxy phosphate ester may be reacted with additional polyphosphoric acid, under the reaction conditions described above for reacting the alcohol with polyphosphoric acid, to form an acidic partial ester. The acidic partial ester is then reacted with a sufficient quantity of an alkylene oxide to substantially neutralize the acidity. The resulting polyhydroxy phosphate ester may be sequentially reacted with additional polyphosphoric acid and alkylene oxide, provided that alkylene oxide is used in the final reaction.

The invention will be more readily understood from a consideration of the following examples which are presented for illustrative purposes and are not to be construed as limiting the invention. Throughout the examples the molar proportions of the polyphosphoric acid component are expressed as moles of $P_2O_5$.

EXAMPLE 1

168.7 grams of polyoxypropylene(2)pentachlorophenol, 101.6 grams of toluene, and 57.5 grams of polyphosphoric acid (83.8% $P_2O_5$) are charged to an autoclave and heated to 105° C. 136 grams of propylene oxide are slowly added to the reaction mass. The temperature is maintained at 102° C. for one hour and then cooled to 40° C., 116.3 grams of polyphosphoric acid are added to the cooled mixture, and the mixture is heated to 105° C. 316 grams of propylene oxide are added, and the mixture is heated at 100–106° C. for 90 minutes. The product is vacuum stripped to constant weight at 100° C. and 1 mm. pressure and filtered through a Buchner type funnel with a Pyrex C fritted glass disc. The resulting product has an acid number of 8.8 and a hydroxyl number of 238 and contains 8.95% phosphorus and 12.8% chlorine.

EXAMPLE 2

300 grams of toluene and 421.2 grams of polyoxypropylene(2)pentachlorophenol are added to a two-liter, 3-necked flask and heated to 100° C. While maintaining the temperature at 100° C., 94.3 grams of polyphosphoric acid are slowly added to the reaction flask over a period of one hour. The contents of the flask are heated at 100° C. for an additional hour and then vacuum stripped of about 168 grams of toluene. 550.5 grams of this product are then charged to an autoclave and heated to 100° C. Propylene oxide is then slowly added, the rate of addition being such that the temperature does not exceed 106° C. In a period of 50 minutes, 265 grams of propylene oxide are added. The resulting product is vacuum stripped at 100° C. and 1 mm. pressure and filtered. It is a very dark brown liquid having an acid number of 9.5 and a hydroxyl number of 197 and containing 5% phosphorus and 32.3% chlorine.

EXAMPLE 3

305.6 grams of polyoxypropylene(2)pentachlorophenol 97.1 grams of polyphosphoric acid, and 178.2 grams of toluene are charged to an autoclave and heated at 105° C. for 2 hours. 260 grams of propylene oxide are slowly added over a 75 minute period. The reaction is continued at 105° C. for an additional 25 minutes. The resulting product, after vacuum stripping to constant weight at 100° C. and 1 mm. pressure and filtering, is a dark brown liquid having an acid number of 2.0 and a hydroxyl number of 204 and containing 6% phosphorus and 26.4% chlorine.

EXAMPLE 4

Following the general procedure described in Example 3, 169.9 grams of polyoxypropylene(2)pentachlorophenol, 57.1 grams of polyphosphoric acid, and 134.5 grams of propylene oxide are reacted in the presence of 102.2 grams of toluene.

EXAMPLE 5

116.3 grams of polyphosphoric acid are added to the product of Example 4, and the resulting mixture is heated to 105° C. 311 grams of propylene oxide are slowly added to the autoclave over a period of 70 minutes. The heat is turned off and the product is allowed to react down while cooling to room temperature. The final product, after filtering and vacuum stripping, is a very dark liquid having an acid number of 1.3 and a hydroxyl number of 241.5 and containing 8.9% phosphorus and 12.4% chlorine.

EXAMPLE 6

319.2 grams of polyoxypropylene(2)dichloroaniline are charged to a reaction flask, and the flask is flushed with nitrogen. The flask is then heated to 60° C.; and 92.2 grams of polyphosphoric acid (83.8% $P_2O_5$) which has been heated to 50° C. is slowly added to the flask, the temperature rising to about 100° C. The resulting product is an acidic partial ester of phosphoric acid and the polyoxypropylene(2)dichloroaniline. 251.0 grams of this partial ester are charged to an autoclave and heated to 110° C. 182.2 grams of propylene oxide is then slowly added to the autoclave over a period of three hours, the temperature rising to a maximum of 110° C. The resulting product, after vacuum stripping and filtering, is a dark, golden-brown liquid having an acid number of 0.5 and a hydroxyl number of 305 and containing 2.4% nitrogen, 5.1% phosphorus, and 12.0% chlorine.

EXAMPLE 7

200 grams of polyoxypropylene(2)dichloroaniline, 300 grams of toluene, and 114.1 grams of polyphosphoric acid are added to a two-liter, 3-necked, reaction flask, and the contents of the flask are heated to 100° C. The polyphosphoric acid is added slowly over a period of one hour. After the addition of the polyphosphoric acid, the reaction temperature is maintained for an additional 30 minutes and then cooled to room temperature. 288.2 grams of the resulting product are charged to an autoclave and heated to 110° C. 282 grams of propylene oxide are slowly added to the autoclave over a period of one hour, and the contents of the autoclave are allowed to react down to atmospheric pressure. The product, after vacuum stripping and filtering, is a dark, slightly cloudy, brown liquid having an acid number of 11 and a hydroxyl number of 276 and containing 1.7% nitrogen, 8.0% phosphorus, and 8.8% chlorine.

The polyhydroxy phosphate esters of this invention may be reacted with organic polyisocyanates in the preparation of polyurethane products such as foams, surface coatings, adhesives, and elastomers. The polyhydroxy phosphate esters may also be reacted with polyepoxide resins in the preparation of casting, laminates and molded articles. The polyhydroxy phosphate esters impart improved flame-resistance to many of the products in which they are employed.

The polyhydroxy phosphate esters of this invention are particularly useful in the preparation of moisture-curing, polyurethane coating compositions which, after application to substrates, yield transparent coatings having superior flame-retardancy and resiliency. In the preparation of such coatings, a blend comprising a polyhydroxy phosphate ester of this invention and a polyoxyalkylene ether of a halogenated aromatic diol is reacted in an organic solvent with an organic polyisocyanate to form an isocyanate-terminated, polyurethane prepolymer. The prepolymer is then diluted with organic solvent to the desired viscosity or solids content and coated onto a substrate. As the solvent evaporates, the moisture in the atmosphere cures the prepolymer.

EXAMPLE 8

11.1 grams of the reaction product of Example 7 and 25.8 grams of polyoxypropylene (2.4) 2,2-bis(4-hydroxydibromophenyl) propane are dissolved in a solvent mixture of 20 grams of xylene and 20 grams of ethylene glycol monoethyl ether acetate. The solution is placed in a one-liter, round-bottom flask equipped with mechanical stirrer, temperature indicator, inert gas inlet, and condenser. The flask is placed in a heating mantle, heat is applied, and carbon dioxide is bubbled into the solution. The stirring rate is set at 130 revolutions per minute, and the solution is heated to 135° C. 23.1 grams of toluene diisocyanate are charged to a flask identical to the one described above. The diisocyanate is dissolved in a solvent mixture consisting of 10 grams of toluene and 10 grams of ethylene glycol monoethyl ether acetate. The polyol solution described above is then added to the diisocyanate solution over a 45 minute period at a temperature of 28–32° C. and at a stirring rate of 130 revolutions per minute. Carbon dioxide gas is bubbled into the reaction mixture, and the mixture is heated to 80° C. The reactants are maintained at 80° C. for five hours and then cooled to room temperature. To 100 grams of this reaction product are added 10 grams of Phosgard C–22–R (a halogenated phosphoric acid derivative) and 0.06 gram of a silicone surfactant, and the solution is diluted with a blend of equal parts of xylene and ethylene glycol monoethyl ether acetate to 50% solids. The resulting solution is painted onto poplar panels according to the method of ASTM test D–1360–58. After a two week conditioning period at 25° C. and 50% relative humidity, the fire resistance of the panels is determined by the ASTM cabinet test method (ASTM test D–1360–58). The burned panels have a weight loss of 14.22 grams and a char volume of 9.8 cubic inches.

EXAMPLE 9

A polyurethane coating composition is prepared following the procedure of Example 8 from the following formulation: polyoxypropylene(2.4) 2,2 - bis(4-hydroxydibromophenyl) propane, 14.9 grams of the product of Example 5, 22.9 grams of toluene diisocyanate, 20 grams xylene, and 20 grams cellosolve acetate. The resulting coating composition is painted onto a poplar panel and tested in the manner of Example 8. The burned panels have a weight loss of 12.98 grams and a char volume of 6.39 cubic inches.

Although this invention has been described with reference to specific alcohols, polyphosphoric acids, and alkylene oxides and to specific reaction conditions, it will be appreciated that numerous other reactants may be substituted for those described and that the particular reaction conditions employed may be modified, all within the spirit and scope of this invention as defined in the appended claims.

Having described the invention, what is desired to be protected by Letters Patent is:

1. A polyhydroxy phosphate ester product obtained by sequentially reacting polyphosphoric acid and an alkylene oxide containing from 2 to 4 carbon atoms, provided that the alkylene oxide is used in the final reaction, with a polyhydroxy phosphate ester prepared by reacting an alkylene oxide containing from 2 to 4 carbon atoms with the reaction product of polyphosphoric acid and an alcohol of the formula

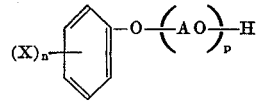

or of the formula

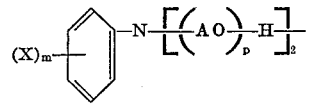

wherein X represents chlorine or bromine, $n$ is an integer from 1 to 5, $m$ is an integer from 1 to 5, A represents an alkylene group containing from 2 to 4 carbon atoms, and $p$ is from 1 to 5, wherein, in the preparation of the reaction product of polyphosphoric acid and an alcohol, the polyphosphoric acid and the alcohol are brought together under reaction conditions sufficiently mild that esterification between P—OH and alcoholic hydroxy groups with concomitant liberation of water is avoided and the ratio of the sum of the mols of alcohol and the mols of water of composition in the phosphoric acid to mols of $P_2O_5$ in the reaction mixture is at least sufficient to convert all of the phosphorus present to the orthophosphate form.

2. A polyhydroxy phosphate ester product of claim 1 wherein the polyphosphoric acid contains at least 80% by weight of phosphoric anhydride and wherein the polyhydroxy phosphate ester prepared by reacting the alkylene oxide with the reaction product of polyphosphoric acid and the alcohol is prepared by forming an acidic partial ester by reacting a polyphosphoric acid containing at least 80% by weight of phosphoric anhydride with the alcohol and reacting the acidic partial ester with a sufficient amount of an alkylene oxide having from 2 to 4 carbon atoms to substantially neutralize the acidity, wherein, in the reaction of the polyphosphoric acid with the alcohol, the ratio of the sum of the mols of the alcohol and the mols of water of composition in the polyphosphoric acid to mols of $P_2O_5$ in the reaction mixture is at least sufficient to convert all of the phosphorus present to the orthophosphate form.

3. A polyhydroxy phosphate ester product of claim 2 wherein X is chlorine, $n$ is 5, $m$ is 2, A is propylene, and $p$ is from 1 to 3.

4. A polyhydroxy phosphate ester product of claim 3 wherein the alkylene oxide is propylene oxide.

5. A polyhydroxy phosphate ester product of claim 2 wherein the polyphosphoric acid contains from 82% to 84% $P_2O_5$.

6. A polyhydroxy phosphate ester product obtained by reacting an alkylene oxide containing from 2 to 4 carbon atoms with the reaction product of polyphosphoric acid and an alcohol of the formula

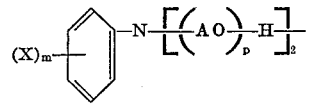

wherein X represents chlorine or bromine, $m$ is an integer from 1 to 5, A represents an alkylene group containing from 2 to 4 carbon atoms, and $p$ is from 1 to 5, wherein, in the preparation of the reaction product of polyphosphoric acid and an alcohol, the polyphosphoric acid and the alcohol are brought together under reaction conditions sufficiently mild that esterification between P—OH and alcoholic hydroxy groups with concomitant liberation of water is avoided and the ratio of the sum of the mols of alcohol and the mols of water of composition in the phosphoric acid to mols of $P_2O_5$ in the reaction mixture is at least sufficient to convert all of the phosphorus present to the orthophosphate form.

7. A polyhydroxy phosphate ester product of claim 6 which is prepared by forming an acidic partial ester by reacting a polyphosphoric acid containing at least 80% by weight of phosphoric anhydride with the alcohol and reacting the acidic partial ester with a sufficient amount of an alkylene oxide having from 2 to 4 carbon atoms to substantially neutralize the acidity, wherein, in the reaction of the polyphosphoric acid with the alcohol, the ratio of the sum of the mols of the alcohol and the mols of water of composition in the plyphosphoric acid to mols of $P_2O_5$ in the reaction mixture is at least sufficient to convert all of the phosphorus present to the orthophosphate form.

8. A polyhydroxy phosphate ester product of claim 7 wherein X is chlorine, $m$ is 2, A is propylene, and $p$ is from 1 to 3.

9. A polyhydroxy phosphate ester product of claim 8 wherein the alkylene oxide is propylene oxide.

10. A polyhydroxy phosphate ester product of claim 7 wherein the polyphosphoric acid contains from 82% to 84% $P_2O_5$.

References Cited
UNITED STATES PATENTS

| | | | |
|---|---|---|---|
| 3,309,427 | 3/1967 | Zech et al. | 260—978 X |
| 3,333,026 | 7/1967 | Larrison | 260—951 X |
| 3,364,153 | 1/1968 | Larrison | 260—951 X |

JOSEPH P. BRUST, Primary Examiner

A. H. SUTTO, Assistant Examiner

U.S. Cl. X.R.

260—2.5 AJ, 2.5 AQ, 2.5 AR, 75 P, 945, 951, 978, 980